United States Patent [19]
Ohie

[11] 4,403,585
[45] Sep. 13, 1983

[54] FUEL INJECTION NOZZLE SYSTEM
[75] Inventor: Tomonori Ohie, Higashimatsuyama, Japan
[73] Assignee: Diesel Kiki Co., Ltd., Tokyo, Japan
[21] Appl. No.: 329,085
[22] Filed: Dec. 9, 1981
[30] Foreign Application Priority Data
Dec. 15, 1980 [JP] Japan ................... 55-175762
[51] Int. Cl.$^3$ ............... F02D 1/04; F02M 39/00
[52] U.S. Cl. .................. 123/446; 239/533.9
[58] Field of Search ................ 123/446, 478; 239/533.8, 533.9, 533.3, 533.4

[56] References Cited
U.S. PATENT DOCUMENTS 3,332,407  7/1967  Scott ........................ 123/446
3,976,249  8/1976  Jarrett ..................... 239/533.9
4,171,099 10/1979  Kopse et al. ............. 239/533.8
4,258,674  3/1981  Wolff ....................... 123/446

Primary Examiner—Ronald B. Cox
Attorney, Agent, or Firm—James Creighton Wray

[57] ABSTRACT

In a fuel injection nozzle system having an injection-valve which is able to adjust the opening pressure to any value, there is provided with a device for adjusting the opening pressure of the injection-valve, a setting circuit for setting a target value for the injection-valve opening pressure in response to at least one signal indicative of the condition of engine operation, and a detecting circuit for detecting the actual value of the injection-valve opening pressure set by the device. The output signals from the detecting circuit and the setting circuit are applied to a circuit for computing the difference between the actual value and the target value and the device is operated in accordance with the signal indicative of the difference so that the actual value of the injection opening pressure is set at the target value of the injection-valve opening pressure with high accuracy.

12 Claims, 4 Drawing Figures

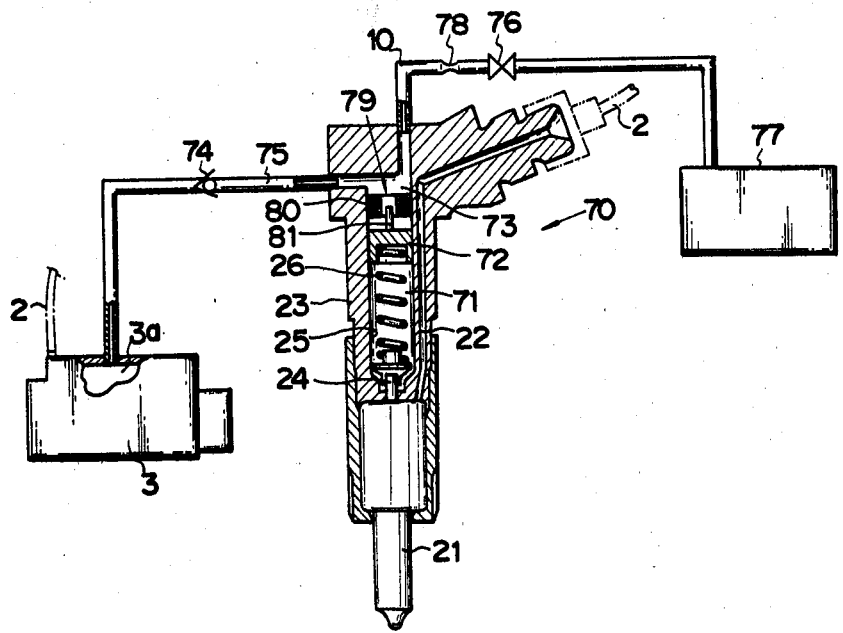

FUEL INJECTION NOZZLE SYSTEM

The present invention relates to a fuel injection nozzle system, and more particuraly to a fuel injection nozzle system for fuel-injected type internal combustion engines, which is able to set an injection-valve opening pressure at any value in accordance with various factors.

For example, a conventional fuel injection nozzle for use in injecting fuel into an internal combustion engine has a spring member for depressing a valve body against a corresponding valve seat, and the force of the spring member is adjusted in such a way that the injection-valve opening pressure is equal to a predetermined constant value. Generally speaking, the optimum value of the opening pressure depends upon such factors as engine speed, load on the engine, temperature of the coolant and so on, so that it is ideal for the injection-valve opening pressure value to be adjusted in accordance with these factors. However, in the prior art, as stated above, the opening pressure value of such an injection-valve is set by the adjustment of the spring bias force at a predetermined constant value which is the optimum value for the maximum power output condition of the engine. Because of this, irregular or intermittent injection is liable to occur in the low engine speed range in engines having a wide speed range such as automobile engines, and the amount of fuel injection is liable to become un-uniform. As a result, the amount of fuel injection exceeds the rated value to produce a lot of HC, CO, smoke etc., so that a problem of exhaust gas pollution arises. In addition, stable idling operation cannot be attained because of the irregular or intermittent injection. To overcome these defects, attempts have been made to develop an injection nozzle in which the set force of the spring for adjusting the injection-valve opening pressure has two stages, or another injection nozzle in which the injection-valve opening pressure varies in relation to the engine speed. However, the former nozzle is not able to assure a sufficient operating condition over the operating range of the engine and the latter nozzle does not have sufficient control accuracy since it relies on an open-loop control system.

It is, therefore, an object of the present invention to provide an improved fuel injection nozzle system for a fuel injection type internal combustion engine.

It is another object of the present invention to provide a fuel injection nozzle system which is able to adjust the injection-valve opening pressure of the injection nozzle with high accuracy in accordance with the condition of engine operation.

It is a further object of the present invention to provide a fuel injection nozzle system which is able to adjust the injection-valve opening pressure of the injection nozzle to the optimum value with high accuracy in accordance with the conditions of engine operation by the use of a closed-loop control system.

According to the present invention, in a fuel injection nozzle system for use in injecting fuel into an internal combustion engine, the system having an injection-valve which is able to adjust the opening pressure to any value, there is provided with an adjusting device for adjusting the opening pressure of the injection-valve, a setting circuit for setting a target value for the injection-valve opening pressure in response to at least one signal indicative of the condition of engine operation, and a detecting circuit for detecting the actual value of the injection-valve opening pressure set by the adjusting device. The output signals from the detecting circuit and the setting circuit are applied to a circuit for computing the difference between the actual value and the target value and the adjusting device is operated in accordance with the signal indicative of the difference so that the actual value of the injection opening pressure is set at the target value of the injection-valve opening pressure with high accuracy. As factors indicative of the condition of engine operation, there can be mentioned engine speed, load on the engine, coolant temperature, atmospheric pressure etc. The system may be operated taking any of these or various other factors into consideration. In a preferred embodiment, the injection-valve opening pressure can be adjusted to any value by adjusting the spring force. Data showing the actual value of the injection-valve opening pressure obtained on the basis of the signal indicative of the set force is fed back to the control system, so that the actual opening pressure may be controlled at optimum value with high accuracy.

According to the arrangement described above, since the injection-valve opening pressure of the injection nozzle can always be adjusted with high accuracy to the optimum value in accordance with the condition of the engine operation, the stability of the fuel injecting operation in idling operation can be greatly improved.

Further objects and advantages of the present invention will be apparent from the following detailed description to be read in conjunction with the accorrmpanying drawings in which:

FIG. 4 is a partial cross sectional view of another embodiment of the injection nozzle having another adjusting mechanism.

Figure 1:
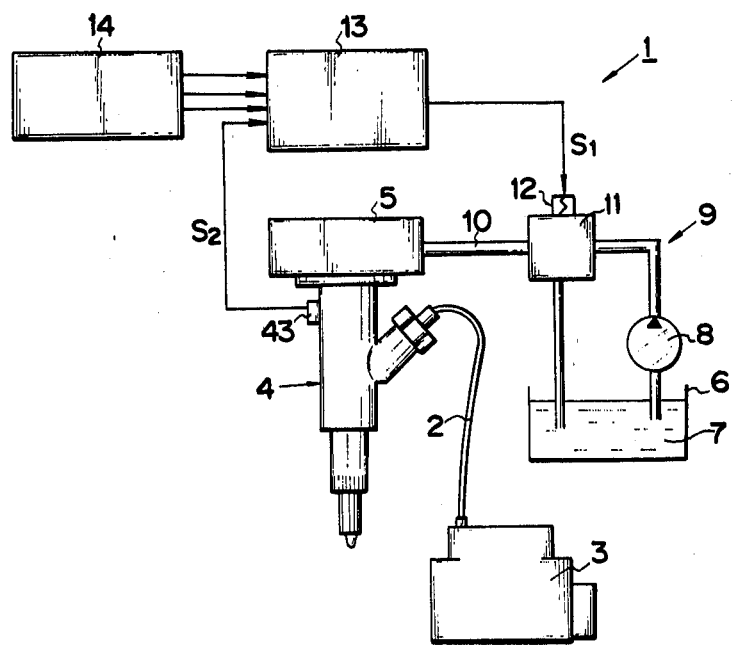
FIG. 1 is a schematic view of an injection nozzle system of the present invention.

FIG. 1 shows a schematic view of the fuel injection nozzle system of the present invention. The fuel injection nozzle system 1 has an injection nozzle 4 mounted on a cylinder head of a diesel engine (not shown) for injecting into a cylinder of the engine the fuel fed from a fuel injection pump 3 through a fuel injection pipe 2. The injection nozzle 4 is provided with an adjusting mechanism 5 for adjusting the injection-valve opening pressure. The adjusting mechanism 5 is adapted to be driven in response to the pressure of the oil fed through the pipe 10 from a pressurized oil supplying device 9 including an oil pump 8 which is driven by the diesel engine and pressurizes oil 7 drawn from an oil tank 6. A solenoid controlled valve 11 is provided at an intermediate portion of the pipe 10 for the purpose of adjusting the pressure of the oil supplied to the adjusting mechanism 5, and a control signal $S_1$ is applied to the exciting coil 12 of the solenoid controlled valve 11 from a control unit 13. To the control unit 13 are applied an electric signal $S_2$, directly or indirectly showing the actual value of the injection-valve opening pressure set by the adjusting mechanism 5, and detection signals from a sensor unit 14 including sensors for electrically detecting the values of factors indicative of the condition of operation of the diesel engine, such as engine speed, temperature of coolant, control rack position. In the control unit 13, the optimum value of the injection-valve opening pressure for the condition of engine operation at every instant is determined as the target injection-valve opening pressure on the basis of the detection signals from the sensor unit 14. For the purpose of detecting the actual value of the injection-valve opening pressure, a position sensor 43 is mounted on the injection nozzle 4 and the signal $S_2$, which is indicative of the actual value of the injection-valve opening pressure, is output from the position sensor 43. The signal $S_2$ is input into the control unit 13 and the target value is compared with the actual value. As a result, there is produced the control signal $S_1$, which shows the degree of opening of the solenoid controlled valve 11 necessary for adjusting the injection-valve opening pressure set by the adjusting mechanism 5 at the target injection-valve opening pressure. The solenoid controlled valve 11 is controlled by the control signal $S_1$, and thus, the injection-valve opening pressure of the injection nozzle 4 is constantly maintained at optimum value determined in accordance with the conditions of the engine operation.

Figure 2:
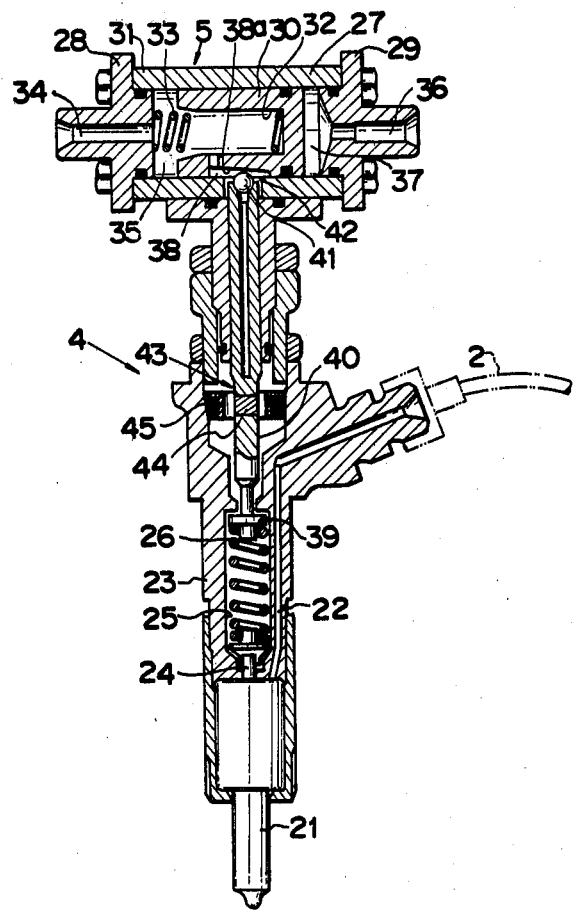
FIG. 2 is a detailed partial cross sectional view of the injection nozzle and the adjusting mechanism of FIG. 1.

FIG. 2 shows a partial cross sectional view of the injection nozzle 4 and the adjusting mechanism 5 of FIG. 1 in more detail. The injection nozzle 4 has a nozzle holder 23 provided with a fuel path 22 for introducing the pressurized fuel fed from the fuel injection pipe 2 to a nozzle body 21, and a needle valve 24 for opening/closing an injection hole (not shown) of the nozzle body 21. The needle valve 24 is able to move forward and backward and is biased downward by the force of a compression coil spring 26 received in a chamber 25 formed in the nozzle holder 23. When the pressure of the fuel supplied from the fuel path 22 exceeds the injection-valve opening pressure determined by the set force of the coil spring 26, the pressure in a fuel well (not shown) formed around the top portion of the needle valve 24 is increased so that the needle valve 24 is urged to upward to allow injection of fuel into the engine cylinder. Since such an arrangement of the nozzle body 21 is well known in prior art, the detailed configuration of the nozzle body 21 is omitted from FIG. 2.

The adjusting mechanism 5 for setting the injection-valve opening pressure at a desired value by adjusting the set force of the coil spring 26, is threadedly attached to the top end portion of the nozzle holder 23. The adjusting mechanism 5 has a cylinderical assembly body composed of a cylindrical body 27 and a piston 30 received therein, and side boards 28 and 29 are fixed by screws at the end openings of the cylindrical body 27. The piston 30 is urged to the right by a compression spring 33, one end of which is received in a hollow portion 32 formed in the piston 30 and the other end of which is pressingly engaged with the side board 28. A cylindrical space 35, in which the spring 33 is received, is communicated with the atmosphere through a path 34 formed in the side board 28, and on the other hand, a cylindrical space 37 difined by the side board 29 and one side face of the piston 30 is communicated with the pipe 10 through a path 36 formed in the side board 29. Consequently, the pressure in the cylindrical space 35 is equal to atmospheric pressure and the pressure in the cylindrical space 37 is maintained at the pressure determined by the pressurized oil supplying device 9. As a result, the piston 30 is positioned at the position where the pressure in the cylindrical space 37 is equal to the spring force of the spring 33. A sloped cut-away portion 38 is formed at one portion of the peripheral surface of the piston 30 and there is provided with a pressure rod 40 between an inclined plane 38a of the cut-away portion 38 and a spring shore 39. A spherical head 41 mounted on one end of the pressure rod 40 projects into the cylindrical body 27 through a hole 42 formed in a wall of the cylindrical body 27. The other end of the pressure rod 40 receives the spring force of the coil spring 26 through the spring shore 39 so that the spherical head 41 is pressed against the inclined plane 38a of the cut-away portion 38. Since the inclined plane 38a is formed so as to make a predetermined angle with respect to the axis of the piston 30, the spring shore 39 is positioned in accordance with the position of the poston 30 so that the set force of the spring 26 can be adjusted by changing the position of the piston 30.

The position of the pressure rod 40 in its axial direction is detected by the position sensor 43 provided in the nozzle holder 23. The position sensor 43, which is of conventional design, is composed of a sensor coil 45 and a magnetic material 44 constituting one portion of the pressure rod 40. The position sensor 43 produces a signal showing the position of the spring shore 39, that is, a signal related to the spring set force.

Figure 3:
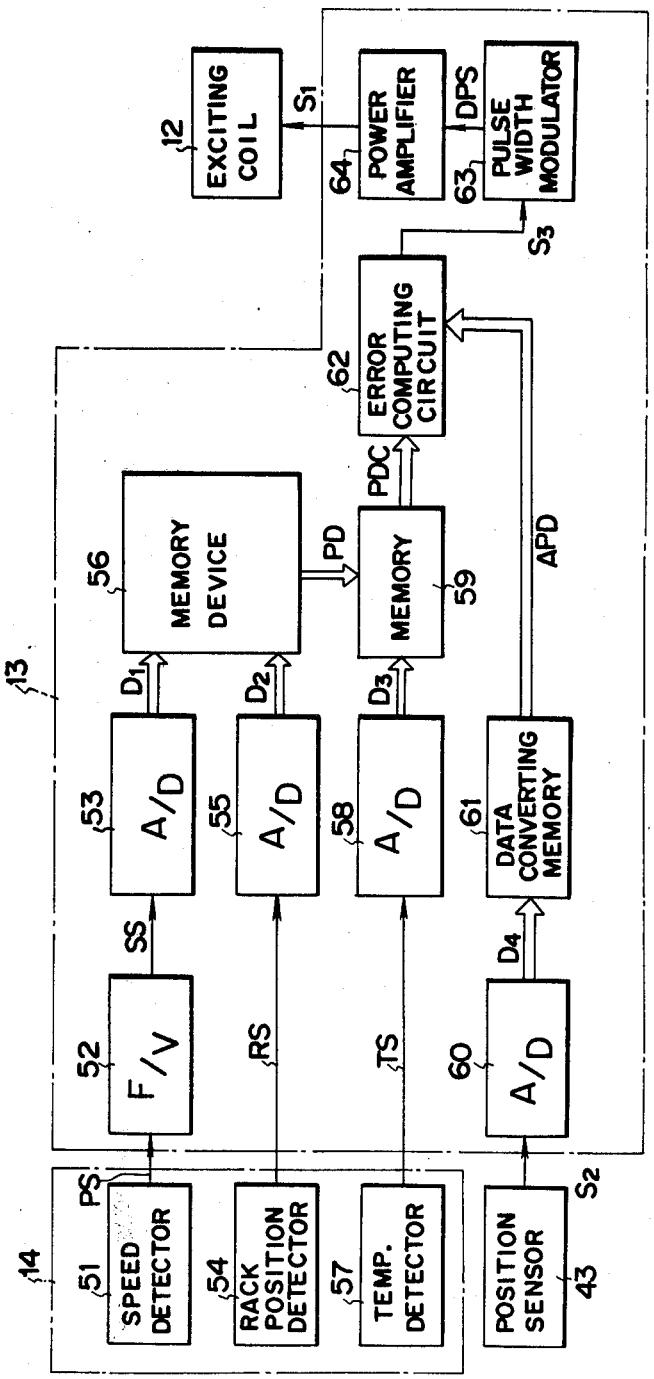
FIG. 3 is a block diagram of a control system of the fuel injection nozzle system illustrated in FIG. 1.

FIG. 3 is a block diagram of a control system of the fuel injection nozzle system 1 illustrated in FIGS. 1 and 2. A pulse signal PS whose frequency varies in accordance with the engine speed is produced from a speed detector 51 for generating a signal relating to the engine speed, and the pulse signal PS is changed by an F/V converter 52 into a speed signal SS whose level varies in accordance with the engine speed. After this, the signal SS is converted into digital form by an A/D converter 53 to produce binary speed data $D_1$. On the other hand, a rack position signal RS having a level changing in accordance with the rack position is produced by a rack position detector 54 for detecting a position of a control-rack of fuel injection pump 3 for injecting fuel into the diesel engine, and the rack position signal RS is changed into binary rack position data $D_2$ by the use of an A/D converter 55.

The block designated by the reference numeral 56 is a memory device in which the optimum values P of the injection-valve opening pressure are stored in digital form. As is well known, a certain relationship exists among the optimum value P, the engine speed N and the control rack position R so that the optimum value P may be determined in accordance with the engine speed N and the control rack position R. The relationship therebetween can, for example, be determined experimentally. In the memory device 56, the optimum values P are stored as optimum opening pressure data PD. The rack position data $D_2$ showing the control-rack position R and the speed data $D_1$ showing the engine speed N are applied to the memory device 56 as read-out address data. The optimum opening pressure data PD corresponding to the data $D_1$ and $D_2$ is stored at the address designated by these data $D_1$ and $D_2$. As a result, the optimum opening pressure data PD indicating the optimum value P of the injection-valve opening pressure for the engine speed N and the control-rack position R at every instant is produced from the memory device 56 when the data $D_1$ and $D_2$ are applied to the memory device 56 as read-out address data.

To detect the temperature of the engine coolant, the system has a temperature detector 57 including a thermosensor, such as a thermistor, a thermocouple, etc., and a temperature signal TS whose level varies in accordance with the coolant temperature is generated by the temperature detector 57. The signal TS is changed into binary temperature data $D_3$ indicating the detected temperature by the use of an A/D converter 58.

In order to temperature-compensate the optimum value P of the injection-valve opening pressure by the use of the temperature data $D_3$, there is provided a temperature compensation data memory 59 in which the data obtained by effecting compensation to the optimum opening pressure data PD about various temperatures are stored, and the memory 59 is adapted to output the necessary temperature-compensated data PDC upon receipt of the data PD and $D_3$ as read-out address data.

In this case, the data stored in the memory device 56 and the memory 59 may be experimental data or data based on the designed value.

The position signal $S_2$ generated by the position sensor 43 and indicating the position of the pressure rod 40 is converted into binary digital data $D_4$ by the use of an A/D converter 60, and after this, the data $D_4$ is applied as read-out address data to a data converting memory 61 in which data showing the actual value of the injection-valve opening pressure in the nozzle 4 are stored in advance in such a way that the actual value of the injection-valve opening pressure which corresponds to the position represented by the data $D_4$ is stored at the address designated by the data $D_4$. Therefore, actual opening pressure data APD for the injection-valve indicating the actual injection-valve opening pressure corresponding to the position of the pressure rod 40 at every instant is outputted from the data converting memory 61 when the data $D_4$ is applied as read-out address data thereto.

Data PDC and APD are applied to an error computing circuit 62 which computes the difference between the target value of the injection-valve opening pressure and the actual value of the injection-valve opening pressure. On the basis of the result of the computation by the error computing circuit 62, there is produced an analog error signal $S_3$ whose level changes in accordance with the difference in output from the circuit 62. The error signal $S_3$ is applied to a pulse width modulator 63 to convert the signal $S_3$ into a driving pulse signal DPS whose duty ratio varies in accordance with the level of the signal $S_3$. The driving pulse signal DPS is amplified in a power amplifier 64, and then, the amplified driving pulse signal is applied as the signal $S_1$ to the exciting coil 12 of the solenoid controlled valve 11. The average opening degree of the solenoid controlled valve 11 is controlled in accordance with the duty ratio of the signal $S_1$. As a result, the adjusting mechanism 5 is operated in such a way that the actual value of the injection-valve opening pressure is coincident with the target value of the injection-valve opening pressure. That is, the average opening degree of the solenoid controlled valve 11 is controlled so as to increase the pressure in the cylindrical space 37 when the actual value of the injection-valve opening pressure is less than the target value of the injection-valve opening pressure, and in contrast, the average opening degree of the solenoid controlled valve 11 is controlled so as to decrease the pressure in the cylindrical space 37 when the actual value of the injection-valve opening pressure is more than the target value of the injection-valve opening pressure.

According to the arrangement described above, since the injection-valve opening pressure of the injection nozzle can always be adjusted with high accuracy to the optimum value in accordance with the condition of the engine operation, the stability of the fuel injecting operation in idling operation can be greatly improved. Moreover, in the case of the above descirbed embodiment, since the oil pressure pump 8 is driven by the engine, the oil pressure applied to the adjusting mechanism 5 is low at low engine speed, and is high at high engine speed. As a result, even if it should become impossible to control the solenoid controlled valve 11 and the valve 11 remains constantly open, since the pressure in the cylindrical space 37 changes roughly in proportion to the engine speed, the injection-valve opening pressure will advantageausly be contolled in accordance with the engine speed under even such a condition. Therefore, insofar as there is employed a fail-safe system by which the solenoid controlled valve 11 is opened in response to the occurrence of a malfunction in the control system, it is possible to control the injection-valve opening pressure in accordance with at least engine speed even if a malfunction occurs in the control system.

Although a hydraulic operating system is employed for the adjusting mechanism in this embodiment, the present invention is not limited to this arrangement. The adjusting mechanism may be arranged in such a way that the position of the piston 30 is directly controlled by the use of a motor, an electromagnetic actuator or the like.

In FIG. 4, there is shown another embodiment of the injection nozzle having another mechanism for adjusting the injection-nozzle opening pressure. The injection nozzle 70 has a cylindrical chamber 71 formed in a nozzle holder 23 adjacent to the end portion of a needle valve 24, and a piston 72 which serves as a spring shore for a spring 26 is received in the cylindrical chamber 71. The pressure in a cam chamber $3a$ of a fuel injection pump 3 is applied to a chamber 73 partitioned by the piston 72 through a pipe 75 having a check valve 74. The chamber 73 is communicated with a fuel tank 77 through a pipe 10. A solenoid controlled valve 76 which corresponds to the solenoid controlled valve 11 shown in FIG. 1 is provided in the pipe 10. The solenoid controlled valve 76 can be controlled by the use of the same control system as that shown in FIG. 3, and opening or closing the valve 76 makes it possible to adjust the pressure in the chamber 73 and to position the piston 72 at the desired position. Therefore, the spring force can be adjusted so that the injection-valve opening pressure of the injection nozzle 70 can be set at the desired pressure. In FIG. 4, the reference numeral 78 denotes an orifice for preventing the pressure in the chamber 73 from rapidly lowering when the solenoid controlled valve 76 is opened.

For the purpose of detecting the position of the piston 72, there is provided a position sensor 79 of the same type as the sensor 43 of FIG. 2. The position sensor 79 is composed of a sensor coil 80 provided in the nozzle holder 23 and a rod-like magnetic material 81 rigidly mounted on the upper surface of the piston 72. Portions of FIG. 4 corresponding to the portions of FIG. 2 are denoted by the same reference numerals.

According to the present invention, since the injection-valve opening pressure of the injection nozzle can be adjusted to the desired optimum value in accordance with predetermined input signals indicating the condition of engine operation, it is possible to operate the injection nozzle at the optimum value of the injection-valve opening pressure and with high accuracy throughout the operating range of the engine. As a result, the stability of the idling operation of the engine can be remarkably improved, and the production of pernicious materials in the exhaust gas can be effectively suppressed.

I claim:

1. A fuel injection nozzle system for use in injecting fuel into an internal combustion engine, comprising:
    an injection-valve which is capable of being adjusted in its injection-valve opening pressure;
    means for adjusting the opening pressure of said injection-valve;
    at least one sensor for detecting a condition of the operation of said engine;
    a first citcuit responsive to the output signal from said sensor for generating a first signal indicative of a target value of the injection-valve opening pressure which is in accord with the condition of the operation of said engine;
    a second circuit for generating a second signal indicative of the actual set value of the opening pressure of said injection-valve set by said adjusting means; and
    a third circuit responsive to said first signal and said second signal for generating a third signal for driving said adjusting means in such a way that said actual value is coincident with said target value.

2. A system as claimed in claim 1 wherein said injection-valve has a needle valve and a spring for urging said needle valve against a corresponding valve seat in a nozzle body.

3. A system as claimed in claim 2 wherein said adjusting means has means for supplying pressurized fluid, a valve means for controlling the pressure of said pressurized fluid in response to said third signal, and an adjusting mechanism for adjusting the force of said spring in response to the fluid pressure controlled by said valve means.

4. A system as claimed in claim 3 wherein said adjusting mechanism has a cylindrical assembly body including a moving body which changes in position in response to the fluid pressure controlled by said valve means and a positioning means for setting the position of said spring in accordance with the displacement of said moving body.

5. A system as claimed in claim 3 wherein said adjusting mechanism has a cylindrical assembly body including a moving body which changes in position in response to the fluid pressure controlled by said valve means and a member positioned between said spring and said moving body, one end of said member receiving the force of said spring and the other end of said member being slidably engaged under pressure with an inclined plane formed on the periphery surface of said piston, said inclined plane making an angle to the moving direction of said piston, whereby said member is displaced in accordance with the displacement of said piston to change the position of said spring.

6. A system as claimed in claim 3 wherein said pressure supplying means is driven by a pump driven by said engine.

7. A system as claimed in claim 6 wherein said pump is a hydraulic pump incorporated into a fuel injection pump which is used with said engine.

8. A system as claimed in claim 3 wherein said adjusting mechanism has a piston member acting as a spring shore for said spring and a cylinder which is defined in a nozzle holder secured to said nozzle body and receives said piston, and fluid pressure is applied to the piston surface opposite to the piston surface which receives the spring force of said spring.

9. A system as claimed in claim 1 wherein said first circuit has a data output circuit for producing first data indicative of a predetermined optimum value of the injection-valve opening pressure in accordance with at least speed data indicative of engine speed and a compensating circuit for effecting compensation of said first data on the basis of at least temperature data indicative of the coolant temperature of said engine, and the compensated data is output as said first signal.

10. A system as claimed in claim 9 wherein said data output circuit and said compensating circuit are memory devices.

11. A system as claimed in claim 1 wherein said third circuit has a circuit for computing the difference between said first signal and said second signal and a circuit for producing a pulse signal whose duty ratio varies in accordance with said difference.

12. A system as claimed in claim 4 or 5 wherein said second circuit includes a position sensor for detecting the position of said spring and a data converting circuit for converting the output signal from said position sensor into data indicative of the actual opening pressure of the injection-valve.

* * * * *